United States Patent [19]
Rampp

[11] Patent Number: 5,950,496
[45] Date of Patent: Sep. 14, 1999

[54] PARKING BRAKE FOR MOTOR VEHICLES TRAILERS OR THE LIKE

[75] Inventor: Armin Rampp, Ursberg, Germany

[73] Assignee: AL-KO Kober AG, Kötz, Germany

[21] Appl. No.: 09/129,495

[22] Filed: Aug. 5, 1998

Related U.S. Application Data

[63] Continuation of application No. 08/727,551, Oct. 2, 1996, abandoned.

[30] Foreign Application Priority Data

Apr. 8, 1994 [DE] Germany .............................. 94 05 849

[51] Int. Cl.[6] ...................................................... G05G 5/06
[52] U.S. Cl. ................................ 74/538; 74/537; 74/523; 74/501.6; 74/501.5 R
[58] Field of Search ............................. 74/537, 538, 523, 74/524, 526, 527, 528, 501.5–502.6

[56] References Cited

U.S. PATENT DOCUMENTS

| 1,741,365 | 12/1929 | Heymann | 188/106 |
|---|---|---|---|
| 2,588,027 | 3/1992 | McCarthy | 188/106 |
| 5,247,850 | 9/1993 | Lenzke | 74/523 |
| 5,509,326 | 4/1996 | Belmond | 74/523 |
| 5,579,660 | 12/1996 | Kemper et al. | 74/473 R |
| 5,609,066 | 3/1997 | Bunker et al. | 74/537 |

FOREIGN PATENT DOCUMENTS

| 0480108 A1 | 4/1992 | European Pat. Off. | 74/538 |
|---|---|---|---|
| 2582272 | 11/1986 | France | 74/538 |
| 2583362 | 12/1986 | France | 74/538 |
| 3820978 A1 | 12/1989 | Germany | 74/538 |
| 612037 | 11/1960 | Italy | 74/537 |

*Primary Examiner*—Vinh T. Luong
*Attorney, Agent, or Firm*—McGlew and Tuttle, P.C.

[57] ABSTRACT

The hand brake lever 1 mounted rotatably at a stationary frame 4 engages with two lever arms 10 to a slide 11, which surrounds a tie rod 15 and is to displace same along its longitudinal axis via a silent ratchet. At least one cable line 6 is linked to the tie rod 15. The silent ratchet includes two clamping pieces 14 made of a plastic or other material, which are located between the side surfaces of the tie rod 15 and of the slide 11, which side surfaces face each other. The clamping pieces 14 are pressed via wedge surfaces 20, 21 against the tie rod 15, and opposite teeth 16, 19 lead to positive locking. The tie rod 15 is also subjected to the force of a tension spring 18 to bring about the absence of clearance.

20 Claims, 4 Drawing Sheets

PARKING BRAKE FOR MOTOR VEHICLES TRAILERS OR THE LIKE

FIELD OF THE INVENTION

This is a Continuation Application of application Ser. No. 08/727,551 filed Oct. 2, 1996, now abandoned and the entire disclosure of this prior application is considered to be part of the disclosure of the accompanying application and is hereby incorporated by reference therein.

The present invention pertains to a parking brake for motor vehicles, vehicle trailers or the like with a means for transmitting the adjusting force of the hand brake lever to at least one cable line leading to the wheel brake. In particular the present invention relates to a parking brake with a means for transmitting adjusting force of a hand brake lever to at least one cable line leading to the wheel brake, and where a slide actuated by the hand brake lever acts on a tie rod connected to the cable line via a releasable locking mechanism. The surfaces of the locking mechanism which engages each other are provided with teeth.

BACKGROUND OF THE INVENTION

In prior-art parking brakes, the hand brake lever is mounted, in principle, rotatably at a stationary frame and is provided with a detent pawl for engaging a toothed segment in the pulled position of the brake lever. A cable line is linked to an arm of the hand brake lever, and the sheathing of this cable line is supported at a spaced location therefrom at the frame.

A parking brake of the above-mentioned type has become known from EP-A 0 040 574, in which a plate-like slide, which is guided along a tie rod and acts on a locking sleeve, is adjusted by the hand brake lever. This locking sleeve surrounds the tie rod, and the outer surface of the tie rod and the wall of the hole in the locking sleeve are provided with barb-like teeth acting in one direction only. A disk, which supports a compression spring acting against a shoulder of the locking sleeve, is stationarily seated at the free end of the tie rod.

This compression spring is to compensate a clearance that becomes established in the locking mechanism in the course of time. However, if the restoring force of the spring in the wheel brake is not sufficient to return the Bowden cable and consequently the tie rod into the starting position during the release of the hand brake because of external effects, e.g., icing or dirt, the locking sleeve is moved into a position unsuitable for the subsequent braking process because of the force of the compression spring along the tie rod.

SUMMARY AND OBJECTS OF THE INVENTION

The basic object of the present invention is to develop a parking brake of the class mentioned in the introduction, in which a lighter and more inexpensive design and automatic adjustment and compensating mechanisms can be achieved with a few individual parts, without having to accept the drawbacks present in the above-mentioned state of the art.

This object is accomplished according to the present invention by a handle connection means selectively connecting and disconnecting a brake handle from a tie rod. When the brake handle is moved from a first position to a second position, the handle connection means connects the brake handle to the tie rod to move the tie rod with the brake handle. This preferably puts tension on the brake cable and applies the brakes on the wheel. When the brake handle is moved to the first position, the handle connection means disconnects the brake handle from the tie rod so that the tie rod is movable back and forth with respect to the brake handle. This allows slack to be taken up from, or given back to, the brake cable. Slack is taken up usually because the brake itself becomes worn out. Slack can also be wrongly taken up if the brakes are frozen in an applied position and the brake handle is moved to unapply the brake. If slack has been wrongly taken up, and then the brake is corrected, slack can be given back with the present invention the next time the brake handle is moved to the first position and the handle connection means disconnects the brake handle from the tie rod. Springs connected to the tie rod and brake cable apply force to insure the correct amount of tension and slack is in the brake cable.

When the brake handle moves from the first position to the second position, the tie rod moves in the first direction. When the brake handle is in the first position, the handle connection means allows movement of the tie rod with respect to the brake handle in said first direction and in a second direction substantially opposite the first direction. This is especially true when the brake handle is stationary in the first position.

The handle connection means connects the brake handle to the tie rod in a plurality of locations, preferably greater than two locations. When the brake handle is in the first position, the handle connection means allows the tie rod to move to any of the locations and to have the brake handle reconnect to the tie rod at any of the locations when the brake handle moves from the first position to the second position.

The handle connection means includes a slide movable with the brake handle and a locking mechanism or binding means for binding the slide to the tie rod when the slide moves with the brake handle from the first position to the second position. The binding means unbinds the slide from the tie rod when the slide is in the first position. In this way when the slide is in its first or resting position, the tie rod is able to more back and forth and reset itself in both directions. If the brake actuating mechanism has worn, the extra slack is taken up. If the cables were previously stuck causing the slider to be incorrectly bound to the tie rod, the next time the slider is returned to the resting position and the cables are unstuck, the tie rod can be properly positioned with respect to the slider. The locking mechanism in particular being designed as a silent ratchet, in which at least one clamping piece is adjustable along the a tie rod and consists of an elastic material. The elastic wall of the clamping piece can be elastically tensioned against the tie rod by the action of wedge surfaces located at the slide and at the clamping piece. Thus, a silent ratchet is used instead of the prior-art locking mechanism to adjust the cable line. The silent ratchet preferably comprises two clamping pieces, which act on opposite side surfaces of the tie rod and receive their pressing force from the slide.

Due to the individual clamping piece consisting of an elastic material and the associated side of the slide having wedge surfaces extending in parallel, whose slope is selected to be such that a transverse force acting on the forked drawbar is generated when the slide is displaced in the tensioning direction, the wall of the clamping piece is elastically tensioned against the tie rod when the hand brake lever is being pulled, and a firm clamping connection is thus achieved. The clamping action is reliably released during the release of the hand brake lever because of the elasticity of the material of the clamping piece, so that the parking means according to the present invention is ready to operate at any time regardless of external effects.

An advantageous variant of the present invention is obtained by providing a stop at the first position of the slider. When the slider moves into the first position, the binding means contacts the stop and causes the slider to be unbound from the tie rod. The stop means can also be used as a stop for the slider, however then it is preferred that the binding means contact the stop means before the slider contacts the stop means. If the resetting of the slide and of the clamping piece is limited by stops, reliable release of the clamping piece from the tie rod is achieved, especially if the clamping piece meets the stop associated with it sooner than does the slide. The wedge surfaces thus become distanced from one another with certainty, which leads to the resetting of the clamping piece wall into the starting position.

Further details of the present invention appear from the subclaims, in which it is essential for a force to act on the clamping pieces by means of, e.g., a leaf spring, opposite the tensioning movement. It shall be ensured as a result that the individual clamping piece cannot move away from the slide in the released state.

Another essential subject of the present invention is that a tension spring anchored at the frame acts on the tie rod in the tensioning direction. The individual cable line is pretensioned by this spring action without the position of the silent ratchet being relevant. Absence of clearance of the cable line is achieved as a result regardless of the actual state of wear of the individual parts of the cable line and of the actuating mechanism of the brake.

The present invention also offers the possibility of guiding two cable lines arranged in parallel to one another at the frame and of suspending the cable lines in a balance arm-like compensating element, on which the tie rod acts in an articulated manner between the linking points of the nipples. The locking force of the hand brake lever can thus be transmitted to two cable lines, which are tensioned uniformly and are arranged without clearance due to the arrangement according to the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
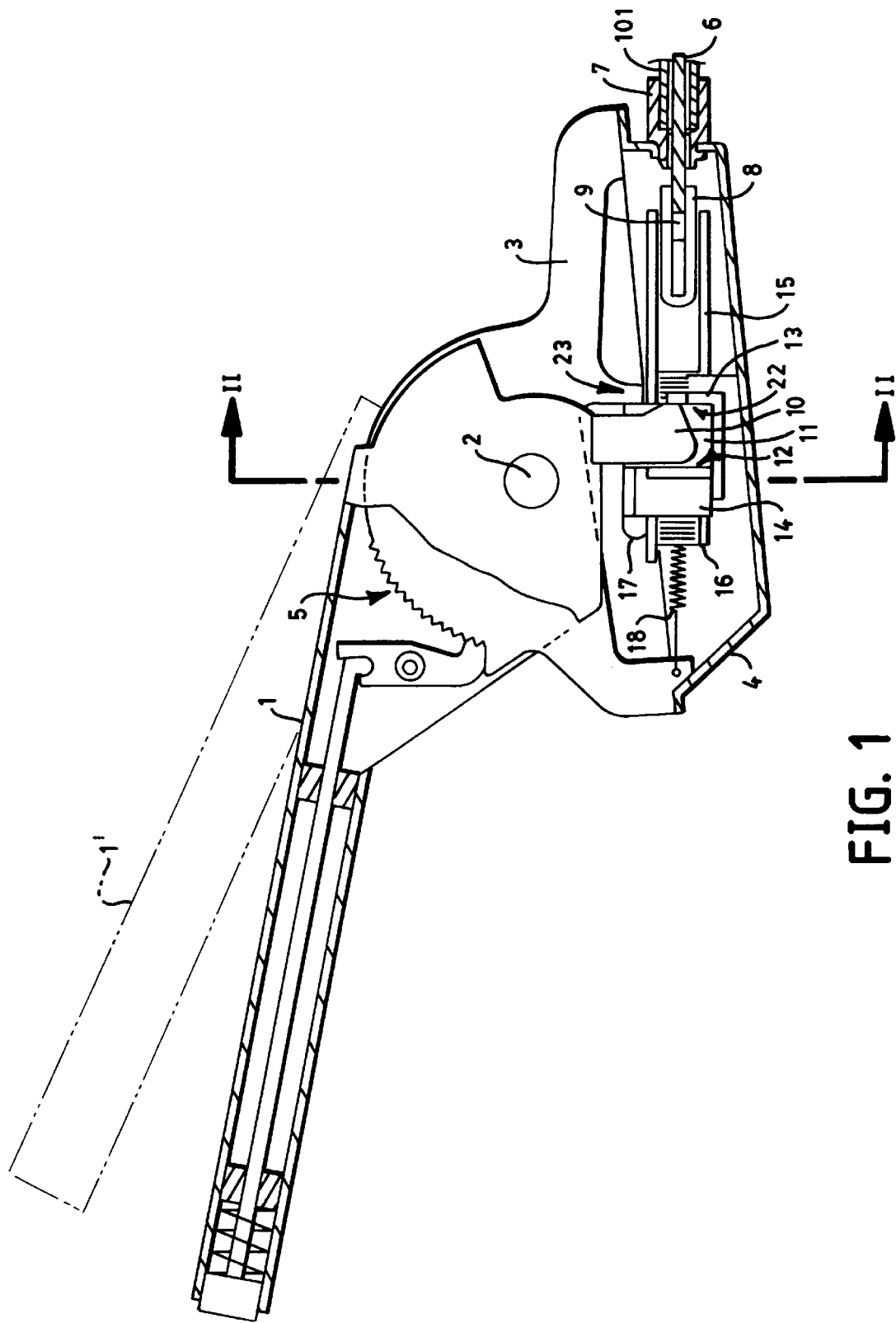
FIG. 1 is a partial side view of the parking brake according to the present invention.

The parking brake shown in FIG. 1 has the usual hand brake lever the 1, which is mounted rotatably around the axis of rotation 2 at a stationary frame 4 or at a bridge support 3 connected to the frame 4. The bridge support 3 has a toothed segment 5, in which a detent pawl, not shown, can snap-in by the usual manner in the pulled or brake position of the hand brake lever 1.

Figure 3:
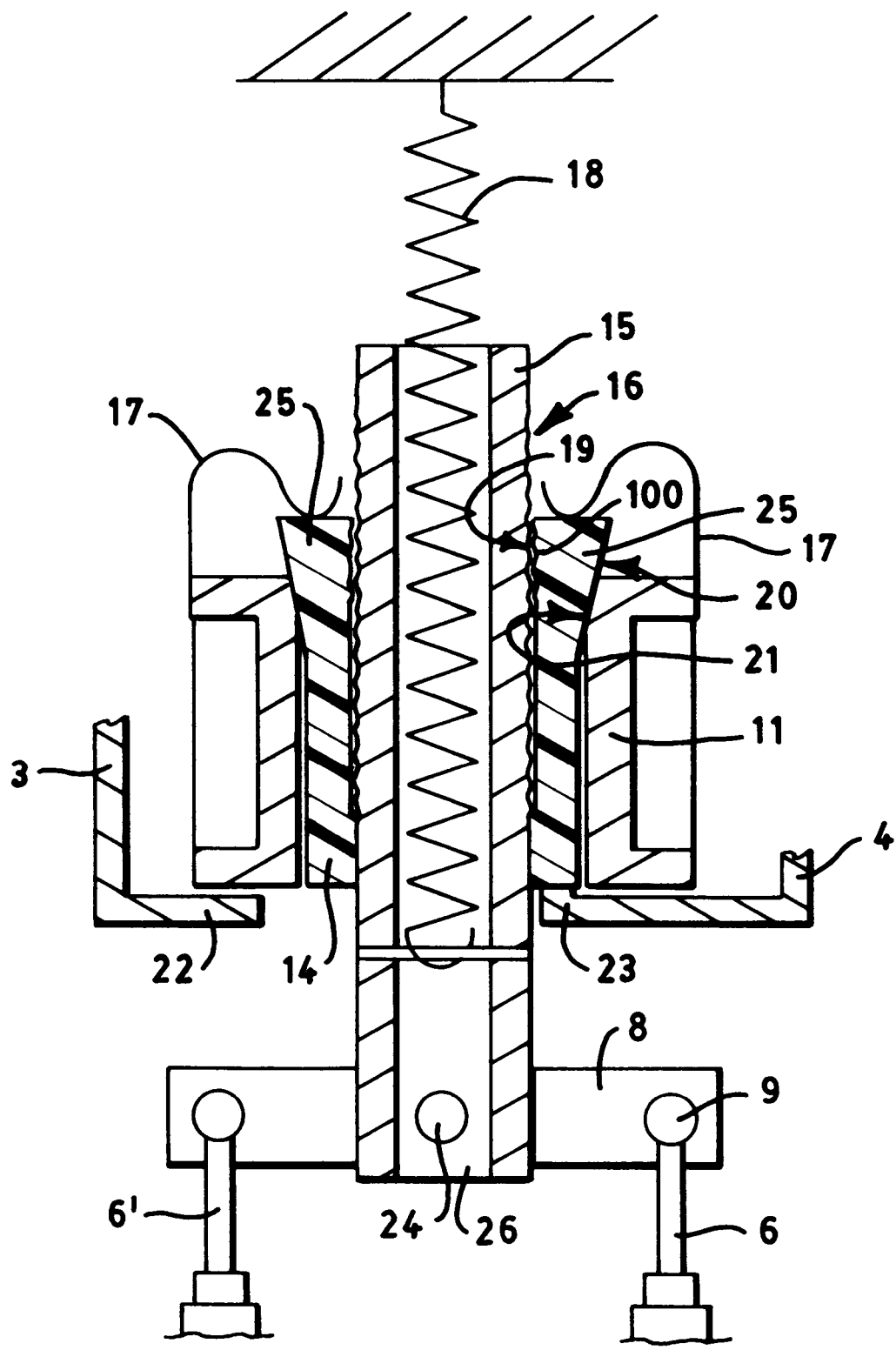
FIG. 3 is a horizontal section along line III—III through the silent ratchet according to FIG. 1, and FIGS. 4 through 6 are horizontal sections according to FIG. 3 on a reduced scale and with different positions of the silent ratchet.

A cable line 6 with its connection cap 7 is guided and supported at the frame 4 and connected to a so-called tie rod 15 by a cable connection means. An outer sheath 101 is positioned around the cable line 6 and connected to connection cap 7. As is shown in FIG. 3, it is also possible to arrange two cable lines 6 next to each other. The cable connection means then includes nipples 9 of the individual cable lines suspended in a balance arm-like compensating element 8, which is mounted on the tie rod 15 by means of the hinge 24.

As is shown in FIGS. 1 and 3, the tie rod 15 is pretensioned by a tension spring 18, which is supported at the frame 4. This tension spring 18 ensures that the individual cable line 6 remains clearance-free regardless of its position and the wear of the Bowden cables and of the brake mechanism.

The forked drawbar 15 is displaced by the hand brake lever 1 via a silent ratchet 14, so that the individual cable line 6 is tensioned as a result.

A handle connection means selectively connects and disconnects the brake handle 1 from the tie rod 15 depending on the position of the brake handle 1. As can be best recognized from FIG. 2, the tie rod 15 is surrounded for this purpose by a slide 11. Lever arms 10, which can engage a front stop wall 12 and a rear stop wall 13, respectively, depending on the direction of rotation of the hand brake lever 1, extend into the slide 11 on both sides. The lever arms 10 are a fixed part of the hand brake lever 1.

Clamping pieces 14, which form a silent ratchet or binding means, are located on both sides between the slide 11 and the tie rod 15. The handle connection means includes the slide 11 and the clamping pieces 14.

Figure 2:
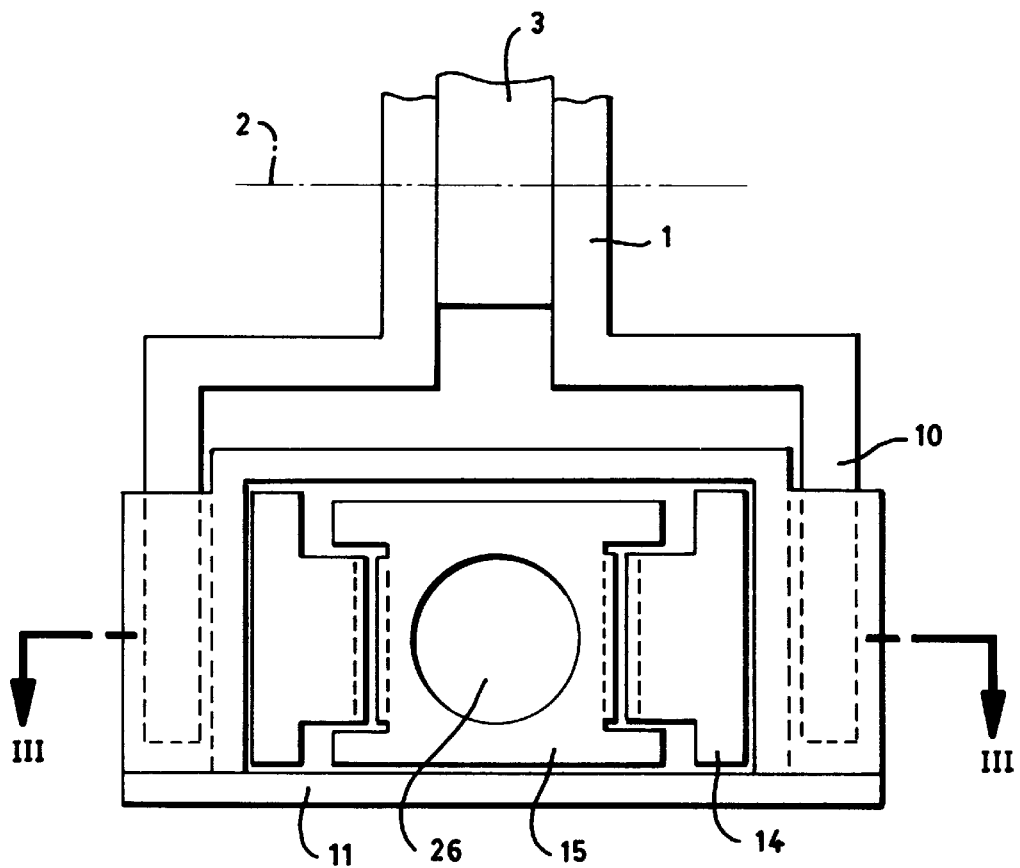
FIG. 2 is a vertical section along line II—II through the parking brake according to FIG. 1.

In the exemplary embodiment according to FIGS. 2 and 3, the clamping pieces 14 consist of a plastic, which shall have an especially high toughness and elasticity. As is shown in FIG. 3 in detail (but not true to scale), the clamping pieces 14 and the side walls of the slide 11 have wedge surfaces 20, 21 extending in parallel to one another. The wedge surfaces are sloped such that when the hand brake lever 1 is pulled from a resting or first position, and after "first position "ub tge second occurrence into a braking or second position shown by broken lines in FIG. 1, the wedge surface 21 of the slide 11 presses the associated clamping piece 14 against the side surface of the tie rod 15.

To increase the clamping action, teeth 16 are provided in the side surfaces of the tie rod 15, and teeth 19 are provided in the inner surfaces of the clamping pieces 14 forming a clamping wall 100, and these teeth engage each other and form a positive locking during the actuation of the slide 11 due to the deformation of the elastic walls 25 of the clamping pieces 14. The adjusting movement of the slide 11 thus leads to an adjusting movement of the tie rod 15 in the same direction and consequently to tensioning of the cable lines 6.

The tension spring 18 is slightly released during the adjustment of the tie rod 15 and of the cable lines 6 in the tensioning direction. However, as soon as the parking brake is released again and the tie rod 15 returns into its starting or resting position, the tension spring 18 resumes the compensation of the clearance in the cable lines 6.

To prevent the clamping pieces 14 from becoming released in the resting position independently from the slide 12, leaf springs 17 are provided, which are fastened to the slide 11 and act against the front surface of the clamping pieces 14. The clamping pieces 14 are thus tensioned against the slide 11 without the spring force of the leaf spring 17 interfering with the tensioning process of the parking brake. During the pulling of the hand brake, the leaf spring 17 presses the clamping pieces 14 with their wedge surfaces 20 against the wedge surfaces 21 of the slide 11 and represents a locking aid for the silent ratchet.

A stop 22, which is met by the slide 11 when the hand brake lever 1 is being returned into the released or resting position, is provided at the frame 4. On the other hand, another stop 23, which is met by the individual clamping piece 14, especially under the action of the leaf spring 17, is provided at the bridge support 3. It is provided here that the clamping piece 14 meets its stop 23 sooner than the slide 21 meets its stop 22. It is thus achieved that the slide 11 is completely distanced from the clamping pieces 14 during the release of the hand brake lever.

Figure 6:
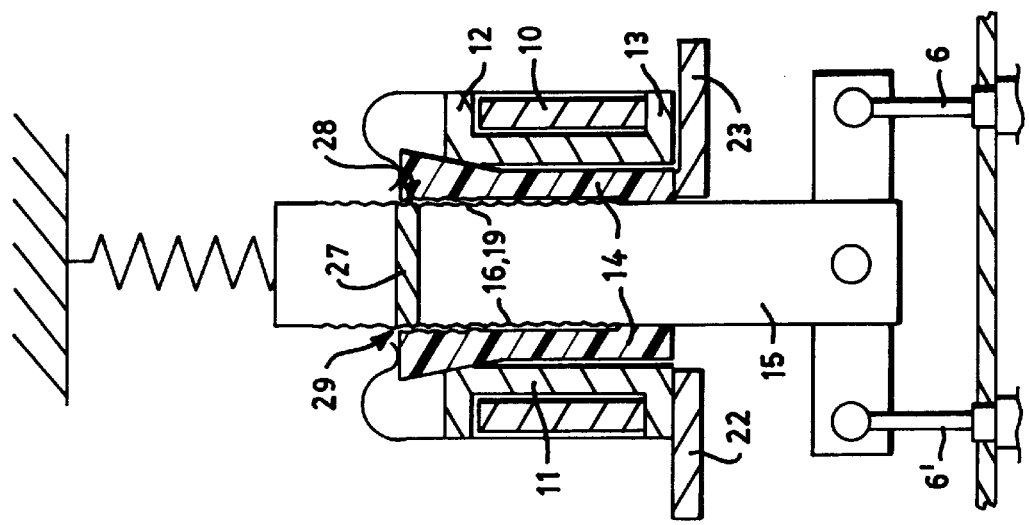
Figure 5:
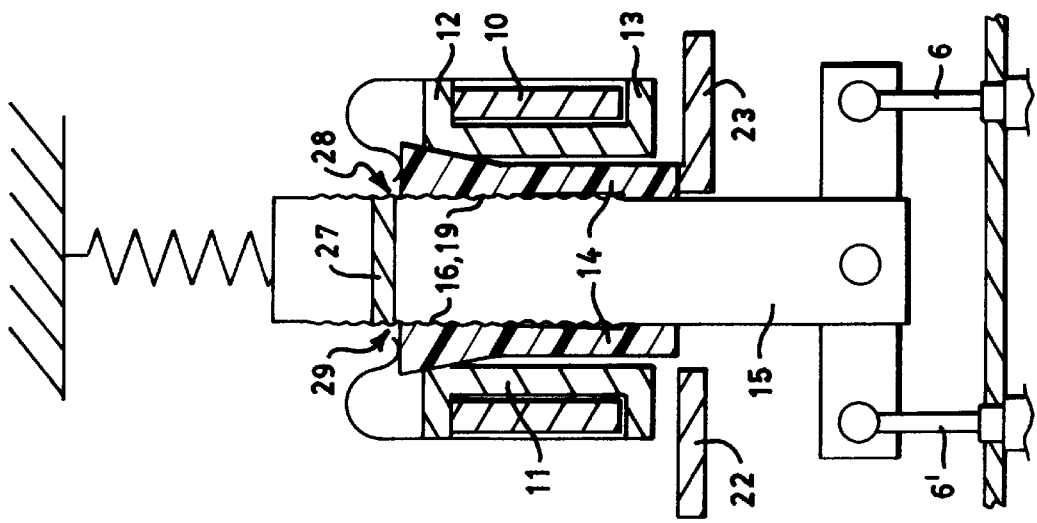
Figure 4:
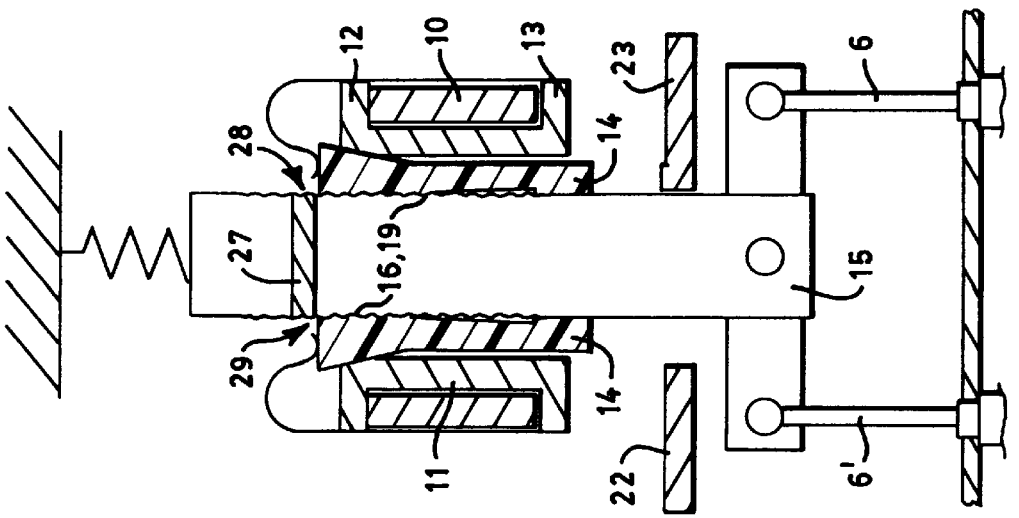

FIGS. 4 through 6 show the silent ratchet according to FIG. 3 in different positions, and a spreading element or means 27, which is part of the slide 11, is additionally shown. This spreading element 27 has edges 28, which taper in a wedge-shaped manner, act against the front edges 29 of the clamping pieces 14 located on the inside and spread apart the clamping pieces 14 on contact such that these can be released from the teeth 16, 19.

The example according to FIG. 4 shows the silent ratchet in the tensioned or braking position of the brake lever 1' shown in broken lines in FIG. 1. The lever arms 10 of the hand brake lever 1 have displaced the slide 11 in the upward direction in the drawing over the front stop wall 12, as a result of which the teeth 16, 19 have engaged each other under the action of the wedge surfaces 20, 21. The cable lines 6 are tensioned. It can also be recognized that there is a greater distance between the lower edge of the clamping pieces 14 and the stops 22, 23.

FIG. 5 shows the released or resting position of the brake, when the clamping mechanism is still closed. The slide 11 has been moved downward, and the restoring spring located at the wheel brake has returned the cable lines 6. The lever arms 10 of the hand brake lever 1 are therefore still in contact with the front stop wall 12. The clamping piece 14 has pushed against the stationary stop 23 and it can no longer participate in the reverse movement, whereas the hand brake lever 1 with the lever arms 10 can still reset the slide 11 farther. The wedge surfaces 20, 21 can thus separate from each other, the consequence of which should be that the elastic deformation of the elastic wall 25 of the clamping pieces 14 is abolished, so that the teeth 16, 19 are released from one another.

However, if the resetting of the elastic walls 25 into their starting position is made difficult or impossible by adhesive forces, icing or dirt or the like, a compulsory resetting of the elastic elements is brought about by the spreading element 27.

On the way from the position according to FIG. 5 into the position according to FIG. 6, the spreading element 27, which is rigidly connected to the slide 11, enters with its oblique edges 28 into the space between the clamping pieces 14. The oblique edges 28 act on the inner front edges 29 of the clamping pieces 14 and force these and the elastic walls 25 to the outside, which leads to complete distancing of the teeth 16, 19.

FIG. 6 also shows that the lever arms 10 of the hand brake lever 1 act against the rear stop wall 13 of the slide 11 during the return stroke of the slide 11.

FIGS. 4 through 6 thus show that the slide 11 and the clamping pieces 14 assume exact positions during the release of the brake and that the tie rod 15 is completely released in the released position of the hand brake and is able to return into its starting position, without external effects being able to affect the function according to the present invention.

As is shown in FIG. 2, a hole 26 is provided in the tie rod 15; this hole 26 is intended essentially to accommodate the tension spring 18, which may have a greater length as a consequence of this to perform its task.

The principle of operation is as follows:

The hand brake lever 1 is rotated clockwise from the resting position shown in FIG. 1 around the axis 2. The lever arms 10 arranged on both sides of the hand brake lever 1 engage fitting guides of the slide 11 and adjust the slide in the tensioning direction. Due to this movement of the slide and to the wedge surfaces 20, 21, the clamping pieces 14 are pressed against the tie rod 15 in the area of their elastic walls 25, and the teeth 16, 19 engage each other. During this initial movement of the slide, the leaf springs 17 prevent the clamping pieces 14 from being carried. As soon as the positive locking of the teeth 16, 19 has been brought about, a slip-free silent ratchet is formed, as a consequence of which the movement of the slide 11 leads to a corresponding movement of the tie rod 15, as a result of which the individual cable line 6 or both cable lines 6 are tensioned.

Secured release of the tie rod 15 takes place via the stops 22, 23 upon the release of the parking brake, as a consequence of which these stops bring about a clearance-free setting of the cable lines 6 and of the actuating mechanism of the brake due to the action of the tension spring 18.

The consequence of the clearance-free setting of the cable lines 6 and of the actuating mechanism of the brake by the tension spring 18 is that the silent ratchet engages the momentarily fitting position of the tie rod 15 during each actuation of the hand brake, as a result of which the necessary rotary movement of the hand brake lever to actuate the brake always remains constant.

While specific embodiments of the invention have been shown and described in detail to illustrate the application of the principles of the invention, it will be understood that the invention may be embodied otherwise without departing from such principles.

What is claimed is:

1. A parking brake device comprising:
    a tie rod having cable connection means for connection to a brake cable;
    a brake handle movable between a first position and a second position;
    handle connection means for connecting and disconnecting said brake handle to and from said tie rod, said handle connection means connecting said brake handle to said tie rod when said brake handle moves from said first position to said second position, said handle connection means disconnecting said brake handle from said tie rod when said brake handle is in said first position, said handle connection means holds said tie rod slidable in two opposite directions with respect to said brake handle when said brake handle is in said first position.

2. A device in accordance with claim 1, wherein:
    said handle connection means moves said tie rod with said brake handle in a first direction when said brake handle moves from said first position to said second position;
    said handle connection means holds said tie rod slidable with respect to said brake handle in said first direction and a second direction when said brake handle is stationary in said first position, said second direction being substantially opposite said first direction.

3. A device in accordance with claim 1, wherein:

said handle connecting means connects said brake handle to said tie rod at one of more than two locations when said handle moves from said first position to said second position, said handle connecting means holding said tie rod slidable to all of said locations when said brake handle is in said first position;

said brake handle, said handle connection means and said tie rod apply tension to the brake cable when said brake handle is in said second position.

4. A device in accordance with claim 1, wherein:

said handle connection means includes a slide connected to said brake handle and movable with said brake handle into said first position and said second position, said handle connection means also includes binding means for binding said slide to said tie rod when said slide moves from said first position to said second position, said binding means unbinding said slide from said tie rod for sliding movements in two opposite directions when said slide is in said first position.

5. A device in accordance with claim 4, wherein:

said slide has a wedge surface;

said binding means includes a clamping piece with a clamping wall positioned adjacent said tie rod, said clamping piece also having a wedge surface positioned in cooperation with said wedge surface of said slide to elasticly force said clamping wall against said tie rod when said brake handle moves from said first position to said second position, said handle connection means also including a stop means for releasing said clamp wall from said tie rod when said brake handle is in said first position.

6. A device in accordance with claim 5, wherein:

said binding means is formed as a silent rachet with said clamping piece being formed of elastic material, said clamping wall and a portion of said tie rod adjacent said clamping wall having a plurality of teeth engaging each other;

the brake cable is adapted to be connected to a wheel brake of a vehicle.

7. A device in accordance with claim 5, wherein:

said binding means includes another clamping piece, said clamping piece and said another clamping piece engaging opposite sides of said tie rod.

8. A device in accordance with claim 5, further comprising:

a frame adapted to be mounted on a vehicle having;

stop means positioned on said frame and for limiting travel of said slide and said clamping piece when said brake handle is in said first position.

9. A device in accordance with claim 8, wherein:

said clamping piece is formed to contact said stop means before said slide contacts said stop means.

10. A device in accordance with claim 8, further comprising:

a tension spring anchored at said frame and acting on said tie rod in a direction from said first position to said second position.

11. A device in accordance with claim 8, further comprising:

another brake cable positioned in part parallel to said brake cable and guided on said frame, said brake cable and said another brake cable being suspended on a balance arm element, said balance arm element being engaged by said tie rod between ends of said brake cable and said another brake cable in an articulated manner.

12. A device in accordance with claim 5, wherein:

said binding means includes a leaf spring biasing said clamping piece against said slide in a direction from said second position to said first position.

13. A device in accordance with claim 5, wherein:

a spreading element is provided on said slide and meets a front edge of said clamping piece in said first position and releases said clamping piece from said tie rod said spreading element has a beveled edge.

14. A device in accordance with claim 1, further comprising:

a frame, said brake handle being pivotal on said frame;

an outer sheath around said cable, said outer sheath being connected to said frame.

15. A parking brake device comprising:

a brake cable;

a tie rod having cable connection means for connection to said brake cable and for disconnection of said tie rod from said brake cable;

a slide slidably connected to said tie rod between a first position and a second position;

brake handle means for moving said slide to move said brake cable;

binding means for binding said slide to said tie rod when said slide moves from said first position to said second position and causing said tie rod to move with said slide when said brake handle moves said slide from said first position to said second position, said binding means unbinding said slide from said tie rod for movement of said tie rod in forward and backward directions with respect to said slide when said slide is in said first position;

a spring biasing said tie rod from said first position to said second position.

16. A device in accordance with claim 15, wherein:

said slide has a wedge surface;

said binding means includes a clamping piece with a clamping wall positioned adjacent said tie rod, said clamping piece also having a wedge surface positioned in cooperation with said wedge surface of said slide to force said clamping wall against said tie rod when said slide moves from said first position to said second position, said binding means also including a stop means for releasing said clamp wall from said tie rod when said slide is in said first position.

17. A device in accordance with claim 16, wherein:

said clamping piece contacts said stop means before said slide contacts said stop means.

18. A device in accordance with claim 16, wherein:

said binding means includes a spreading means for spreading said clamping wall away from said tie rod.

19. A device in accordance with claim 18, wherein:

said spreading means contacts an edge of said clamping wall in said first position.

20. A device in accordance with claim 15, further comprising:

a frame, said brake handle being pivotal on said frame;

an outer sheath around said cable, said outer sheath being connected to said frame.

* * * * *